US007196997B2

(12) United States Patent
Stek et al.

(10) Patent No.: US 7,196,997 B2
(45) Date of Patent: Mar. 27, 2007

(54) WAVEFORM EQUALIZER FOR OBTAINING A CORRECTED SIGNAL AND APPARATUS FOR REPRODUCING INFORMATION

(75) Inventors: Aalbert Stek, Eindhoven (NL); Peter Marchel Linotte, Eindhoven (NL); Theodorus Petrus Henricus Gerardus Jansen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 315 days.

(21) Appl. No.: 10/481,145

(22) PCT Filed: Jun. 20, 2002

(86) PCT No.: PCT/IB02/02372

§ 371 (c)(1),
(2), (4) Date: Dec. 17, 2003

(87) PCT Pub. No.: WO03/005356

PCT Pub. Date: Jan. 16, 2003

(65) Prior Publication Data

US 2004/0151104 A1 Aug. 5, 2004

(30) Foreign Application Priority Data

Jul. 2, 2001 (EP) ................................ 01202527

(51) Int. Cl.
*G11B 5/09* (2006.01)

(52) U.S. Cl. ................................ 369/59.16; 369/59.15

(58) Field of Classification Search .................... None
See application file for complete search history.

(56) References Cited

U.S. PATENT DOCUMENTS 5,999,510 A * 12/1999 Enomoto .............. 369/124.13

(Continued)

FOREIGN PATENT DOCUMENTS

EP 0940811 9/1999

(Continued)

*Primary Examiner*—William Korzuch
*Assistant Examiner*—Adam R. Giesy
(74) *Attorney, Agent, or Firm*—Michael E. Belk

(57) ABSTRACT

The waveform equalizer (6) for obtaining a corrected signal S' by performing a waveform equalization to a read signal S read out from an information carrier (1). The waveform equalizer (6) has a first filter (61) able to perform a filtering process to said read signal S, and an amplitude limiting means (62) able to obtain an amplitude limited read signal SLIM by limiting an amplitude level of said read signal S by a predetermined amplitude limitation value. A second filter (63) is provided which is able to perform a filtering process to said amplitude limited read signal SLIM. Further, an adder (64) is present which is able to add the signals obtained by performing the filtering process by each of said first (61) and second filters (63), able to generate an addition result as said corrected read signal S'. The signal frequency response of said waveform equalizer (6) to signals having an amplitude smaller than said predetermined amplitude limitation value, has a notch in a first frequency region from zero to a frequency at which the signal frequency response is at a maximum amplitude. The apparatus for reproducing information recorded on an information carrier (1), having the waveform equalizer (6) is able to read the information with a higher S/N ratio and a lower data jitter. As a result the information reproducing apparatus can be applied for a higher bit density and at the same time having a acceptable S/N ratio and data jitter.

4 Claims, 6 Drawing Sheets

U.S. PATENT DOCUMENTS

| | | | | |
|---|---|---|---|---|
| 6,278,675 | B1 * | 8/2001 | Kuribayashi et al. | 369/59.17 |
| 6,947,499 | B2 * | 9/2005 | Sakurai | 375/327 |
| 6,970,403 | B2 * | 11/2005 | Kadlec et al. | 369/44.29 |

FOREIGN PATENT DOCUMENTS

| | | | | |
|---|---|---|---|---|
| EP | 940811 | A1 | * | 9/1999 |

* cited by examiner

WAVEFORM EQUALIZER FOR OBTAINING A CORRECTED SIGNAL AND APPARATUS FOR REPRODUCING INFORMATION

The invention relates to a waveform equalizer for obtaining a corrected signal S' by performing a waveform equalization to a read signal S read out from an information carrier, comprising:

- a first filter able to perform a filtering process to said read signal S;
- amplitude limiting means able to obtain an amplitude limited read signal $S_{LIM}$ by limiting an amplitude level of said read signal S by a predetermined amplitude limitation value;
- a second filter able to perform a filtering process to said amplitude limited read signal $S_{LIM}$;
- an adder able to add the signals obtained by performing the filtering process by each of said first and second filters, able to generate an addition result as said corrected signal S'.

The invention also relates to an apparatus for reproducing information recorded on an information carrier having such a waveform equalizer.

Such an equalizer is known from the European Patent Application 0 940 811. In this patent application a waveform equalizer is disclosed, which solves the problem of improving an S/N ratio of a read signal read out from an information carrier, on which digital data is recorded at a high density, without causing extra inter symbol interference and consequently without extra jitter in said read signal.

Waveform equalizers may be used in an information reproducing apparatus, for example in optical disc players, such as the CD- or DVD-players. In such an apparatus a reading head generates a read signal from a track on an information carrier. Reproducing characteristics of the recorded information reproducing system are low pass filter characteristics.

To improve the S/N ratio of a read signal read out from an information carrier, on which digital data has been recorded at a high density, there is a known technique to perform a waveform equalization by executing a filtering process to emphasize high frequency components of the read signal. With a linear waveform equalizer without an amplitude limiting means the read signal is boosted to improve the S/N ratio, as a result also the jitter improves. This holds until a certain point where ISI becomes dominant over noise and the jitter increases. Therefore, if the high frequency components are excessively emphasized, the ISI and therewith the jitter increases.

The known equalizer has an amplitude limiting means in front of a filter. The known waveform equalizer improves the S/N ratio without causing extra ISI in a read signal read out, as a result the jitter is decreased.

In current state of the art digital recording media, the bit density tends to increase. With increasing bit density the requirements on jitter and S/N ratio have to be maintained. The known equalizer has the disadvantage not to be able to meet the requirements in jitter and S/N ratio at a relatively high bit density.

It is a first object of the invention to provide a waveform equalizer of the kind described in the opening paragraph, which has a relatively low jitter and a relatively high S/N ratio even at a relatively high bit density.

It is a second object of the invention to provide an apparatus for reproducing information recorded on an information carrier having such a waveform equalizer.

The first object is realized in that a signal frequency response of said waveform equalizer to signals having an amplitude smaller than said predetermined amplitude limitation value, has a notch in a first frequency region from zero to a frequency at which the signal frequency response is at a maximum amplitude.

In the field of application of the waveform equalizer, a relatively large contribution of the lower frequencies to the S/N ratio is discovered by the inventor. A suppression of these frequencies improves the S/N ratio. Said notch is a point at a specific frequency at which the filter suppresses signals with this frequency to an infinite small amplitude. Signals having a frequency in a frequency area surrounding said specific frequency are suppressed to a relatively small amplitude.

In a favorable embodiment of the waveform equalizer the second filter is a FIR filter having tap coefficients [−m,0,0,−m], and the first filter is a FIR filter having tap coefficients [0,1,1]. The abbreviation FIR stands for Finite Impulse Response. This filter thus has an impulse response which is finite. Such a filter consists of tap delays, amplifying units, and an adder for adding the outputs of the tap delays and amplifying units. The amplifying units have an amplification factor m. Depending on the value of m, the frequency response of this waveform equalizer has a notch in said first frequency region. This waveform equalizer may be used in run length limited, RLL, codes. RLL codes are indicated by parameters d and k. The d stands for a minimum run length constraint, and the k for a maximum run length constraint. A run length smaller than d+1 is not allowed, a run longer than k+1 is not allowed either. The waveform equalizer is suitable for a RLL code where d=1.

It is advantageous if the waveform equalizer has a second filter which is a FIR filter having tap coefficients [−m,0,0,0,−m], and the first filter is a FIR filter having tap coefficients [0,0,1,1]. For values of m greater than one, the frequency response of this waveform equalizer has a notch in said first frequency region. This waveform equalizer may be used in a RLL code wherein d=2.

The second object of the invention is realized in that an apparatus for reproducing information recorded on an information carrier is provided with the waveform equalizer of the invention. Such an apparatus may further comprise:

- a read head able to read information from the information carrier;
- a displacement means able to cause a relative displacement between the information carrier and the read head;
- sampling means, able to sample the signal coming from the read head;
- a bit detection means;
- a channel decoding means able to decode the created bit-stream.

Such an apparatus has an increased S/N ratio and a decreased jitter at the input of the bit detection means. Therefore, in operation, the bit detection is performed with less errors, and consequently the information from the information carrier is read with a relatively low bit error rate.

These and other aspects of the waveform equalizer and the apparatus for reproducing information according to the invention will be apparent from and be elucidated by means of the drawings, in which:

FIG. 1 schematically shows the information reproducing apparatus having the waveform equalizer;

Figure 6:
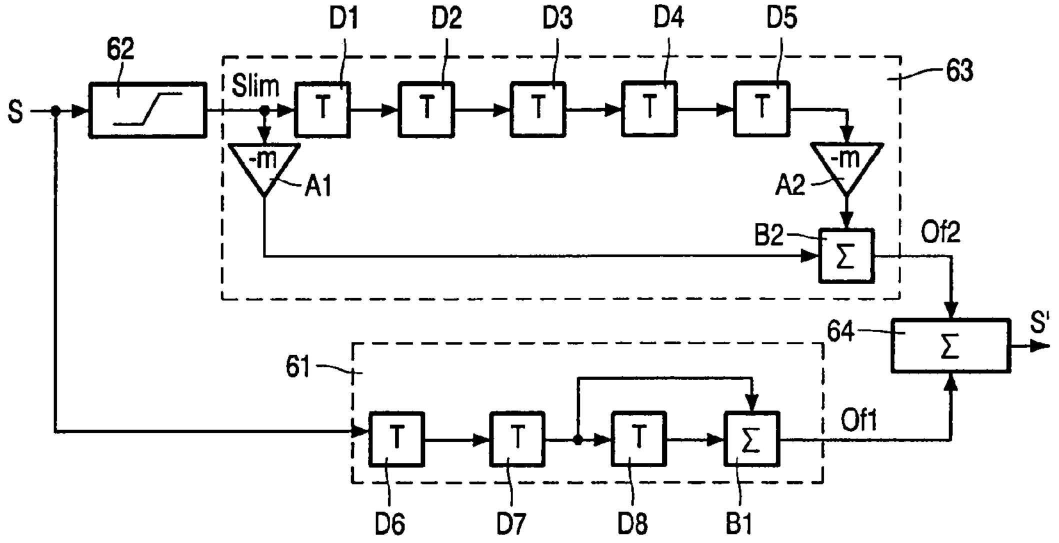
FIG. 6 shows an other embodiment of the waveform equalizer according to the invention.
Figure 8A:
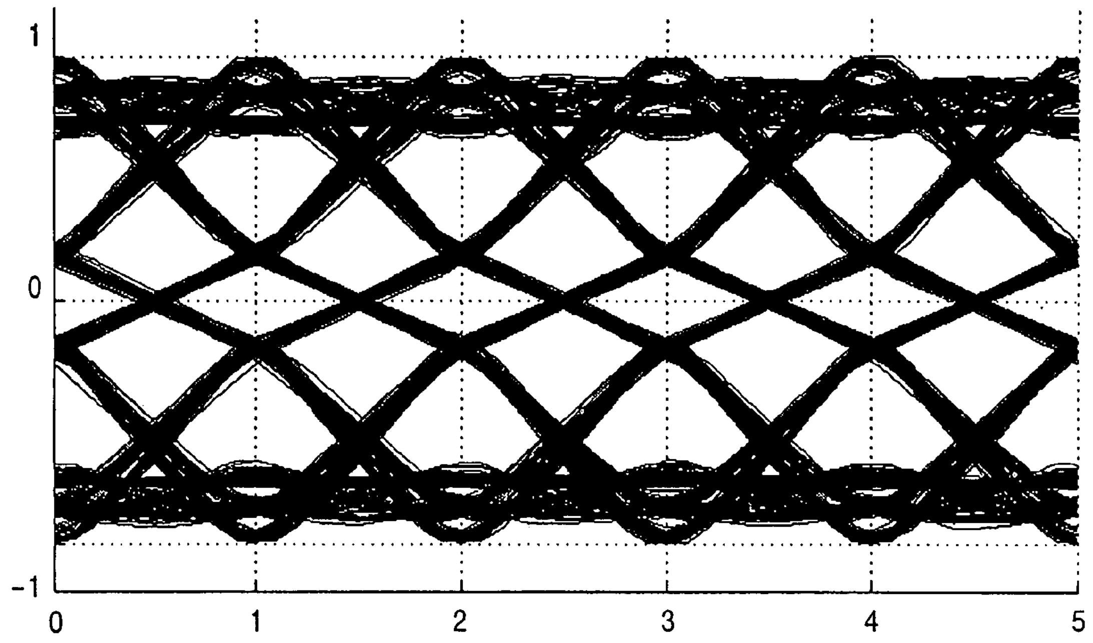
Figure 8B:
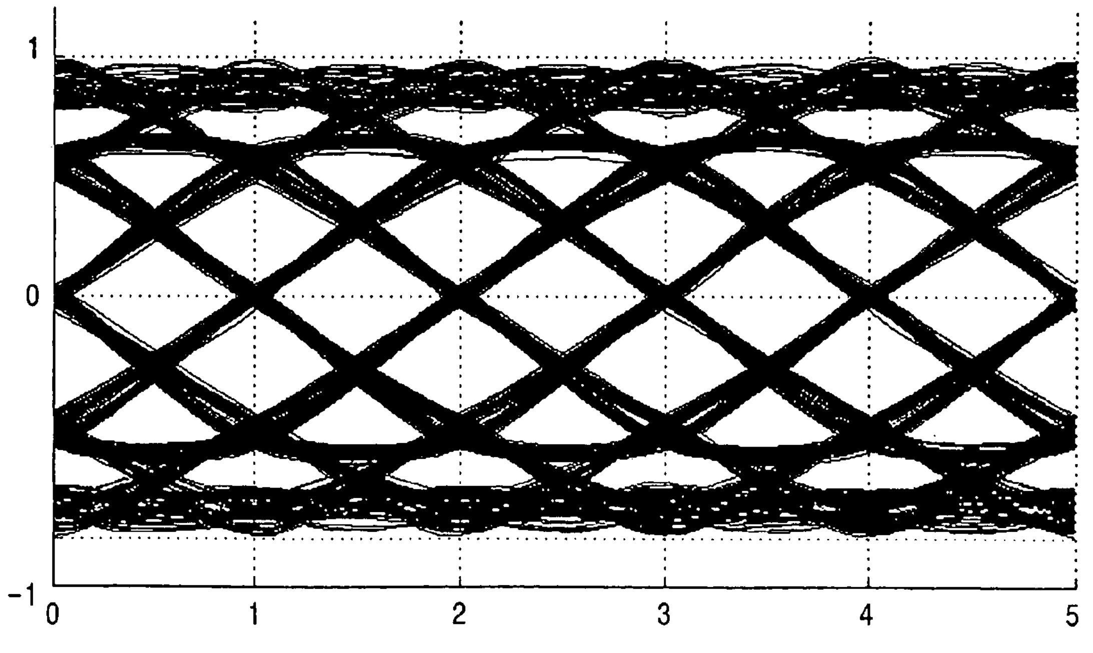
Figure 9A:
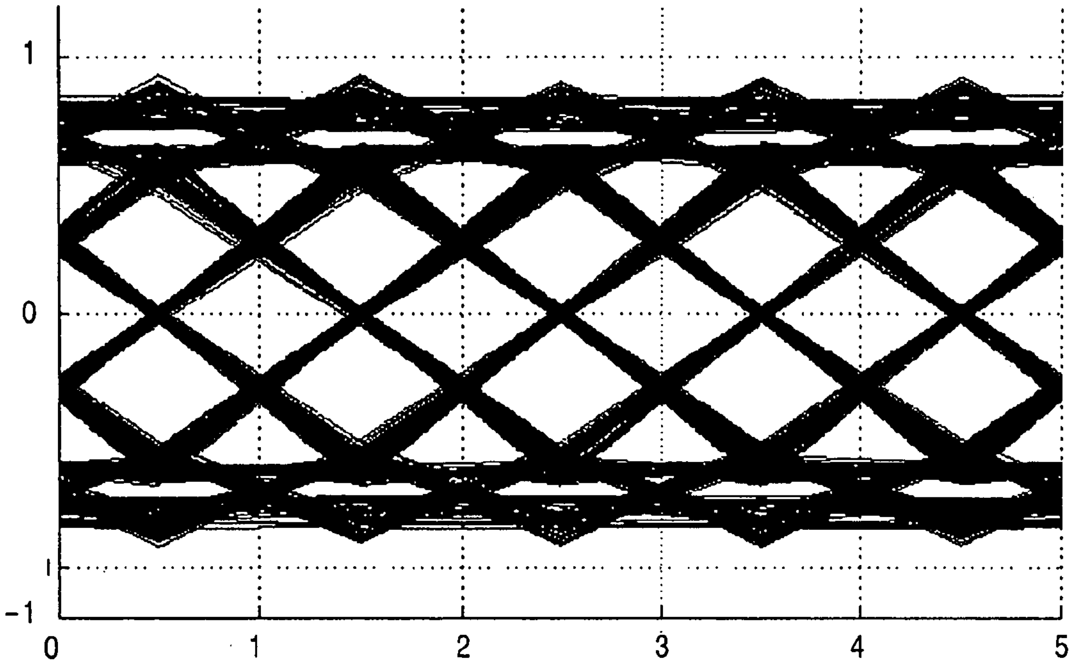
Figure 9B:
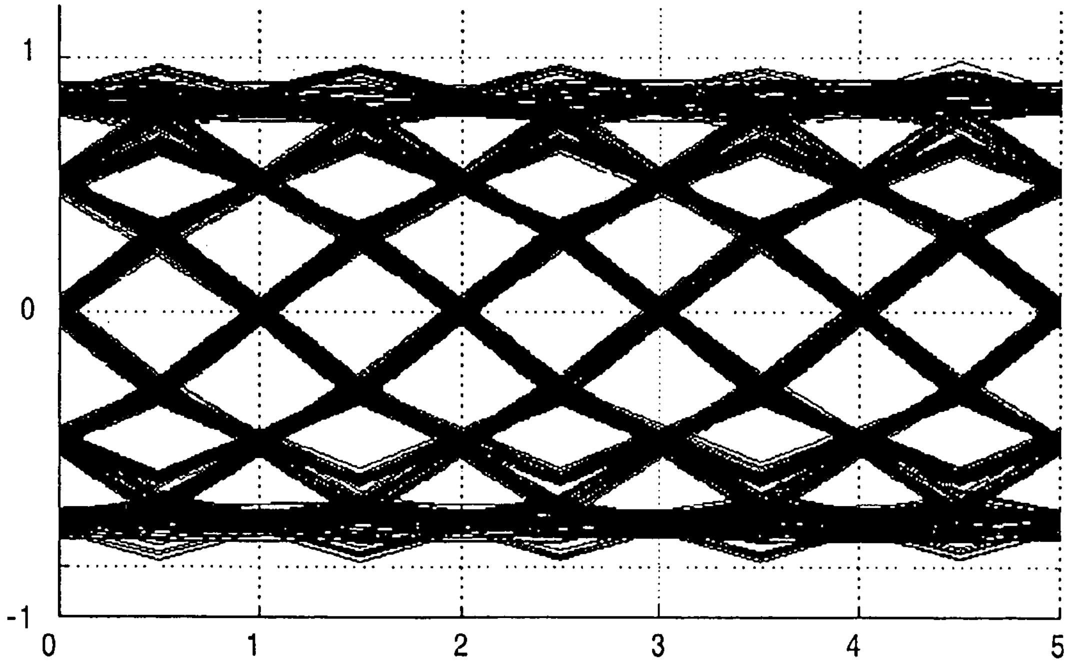
Figure 10A:
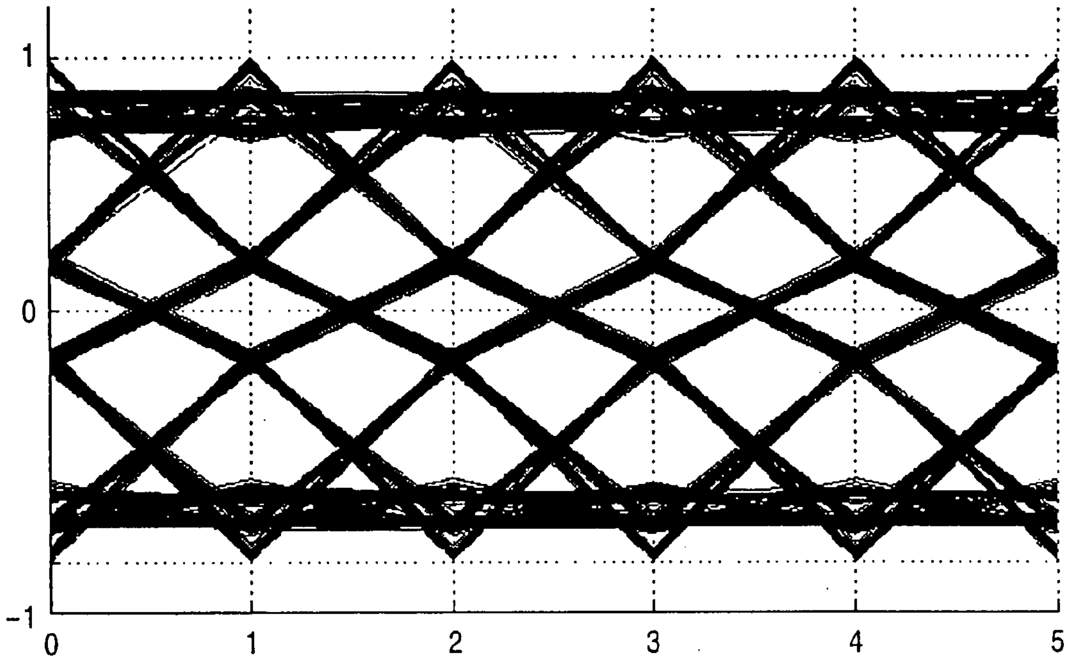
Figure 10B:
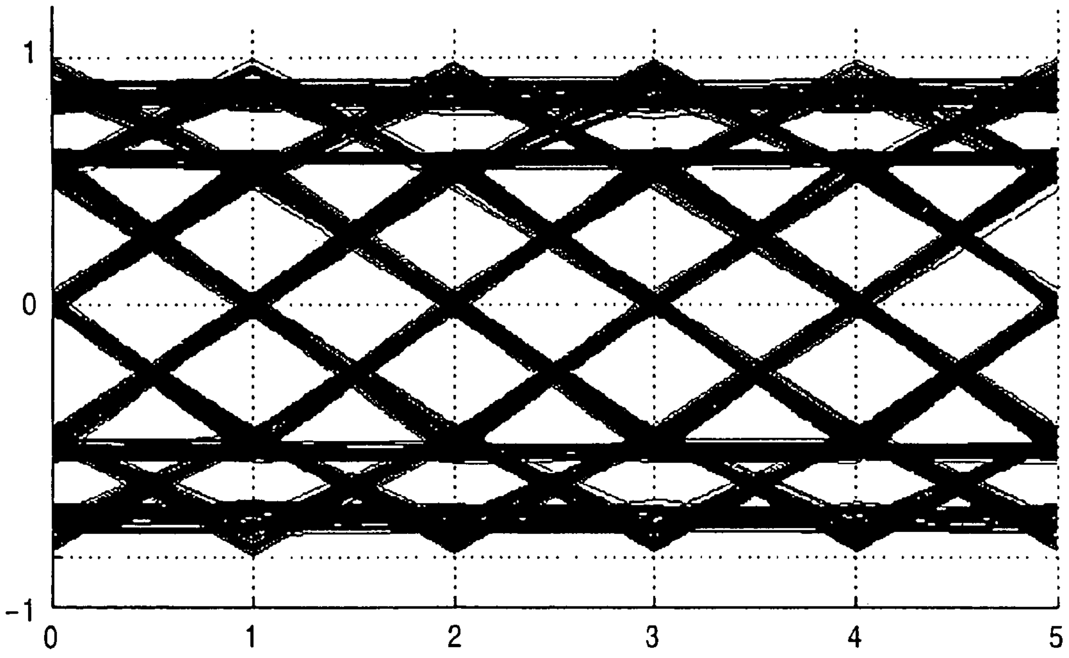

FIG. 8*a* shows an eye-pattern of data sampled at ten times the data bit frequency at the output of the known waveform equalizer of EP-A-0 940 811;

FIG. 8*b* shows an eye-pattern of data sampled at ten times the data bit frequency at the output of the embodiment of the waveform equalizer of FIG. 6;

FIG. 9*a* shows an eye-pattern of the known waveform equalizer with a sampling frequency the same as the data bit frequency and with sampling points at zero crossing;

FIG. 9*b* shows an eye-pattern of the waveform equalizer of FIG. 6 with a sampling frequency the same as the data bit frequency and with sampling points at zero crossing;

FIG. 10*a* shows an eye-pattern of the known waveform equalizer as in FIG. 9*a*, but the sampling point are shifted a halve bit;

FIG. 10*b* shows an eye-pattern of the waveform equalizer of FIG. 6, but the sampling point are shifted a halve bit.

Figure 1:
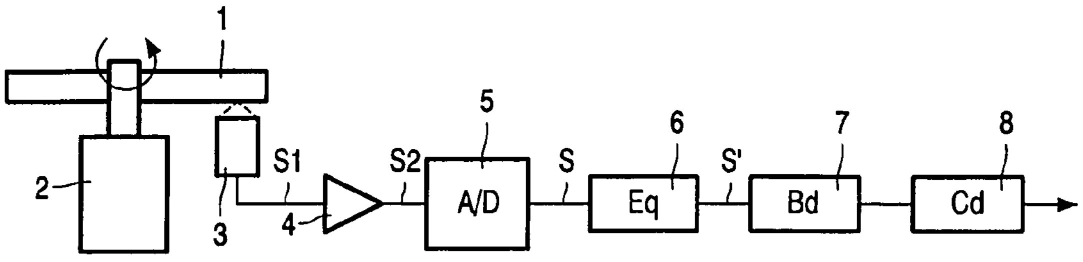

The information reproducing device shown in FIG. 1 comprises a read head 3 for reading the information from an information carrier 1. A displacement means 2 is able to cause a relative displacement between the information carrier 1 and the read head 3. In operation, an output signal $S_1$ of the read head 3 is fed to an amplifier 4. The amplifier 4 amplifies the output signal $S_1$ to a desired level and supplies an amplified signal $S_2$ to an analog to digital A/D converter 5. The A/D converter 5 converts the amplified signal $S_2$ to a sampled read signal S, using a sampling period of T seconds. The sampled read signal S is fed to the waveform equalizer 6. The waveform equalizer 6 obtains a corrected signal S' by performing a waveform equalization to the read signal S. The output of the waveform equalizer 6 is fed to a bit-detection means 7. The output of the bit-detection means 7 is fed to a channel decoding means 8.

Figure 2:
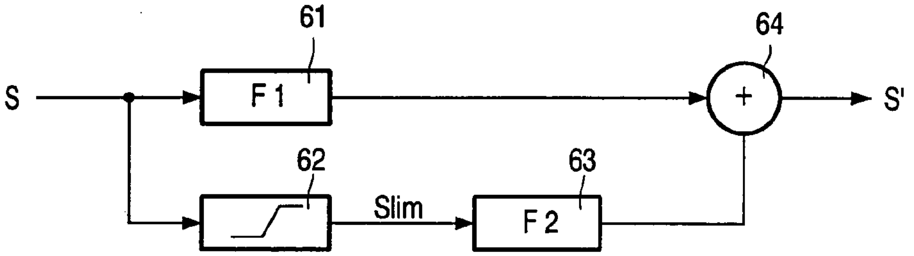
FIG. 2 shows an example of an internal structure of the waveform equalizer.

An example of the internal structure of the waveform equalizer 6 is shown in FIG. 2. An amplitude limiting means 62 performs amplitude limitation on the sampled read signal S and supplies an obtained amplitude limited signal $S_{LIM}$ to the second filter 63. The read signal S is also an input of the first filter 61. The output of filter 61 and of filter 63 are added by adder 64.

A frequency response of the waveform equalizer 6 to signals having an amplitude smaller than said predetermined amplitude limitation value, has a notch in a frequency region from zero to a frequency at which the frequency response is at a maximum amplitude. The amplitude limiting means 62 doesn't have a substantial effect in the frequency response, because the amplitude of signals used to determine the frequency response are smaller than the limit set in the amplitude limiting means 62 at which the amplitude is limited.

Reproducing characteristics of the information reproducing apparatus as shown in FIG. 1 are low pass filter characteristics. In order to increase recording density, it is advantageous to set the frequency of a signal corresponding to a minimum run length to a value near the cut-off wavelength. The level of the read signal corresponding to the minimum run length, consequently, decreases.

In order to improve the S/N ratio of the signal of minimum run length, the high frequency components corresponding to the signal of minimum run length are raised by the combination of the first filter 61 and second filter 63.

The waveform equalizer 6 is provided with an amplitude limiting circuit 62 to counteract an increase of inter symbol interference. Without the amplitude limiting circuit 62, if an excessive high frequency emphasis is made, inter symbol interference increases and, as a result jitter increases.

The known waveform equalizer boosts the high frequencies. No attention is given to the lower frequency region. The waveform equalizer 6 of the invention however has a notch in the lower frequency region, which suppresses signals in the lower frequency region. It appears that extra suppression of noise in this frequency region gives remarkable improvements in decreasing jitter and increasing S/N ratio.

Figure 3:
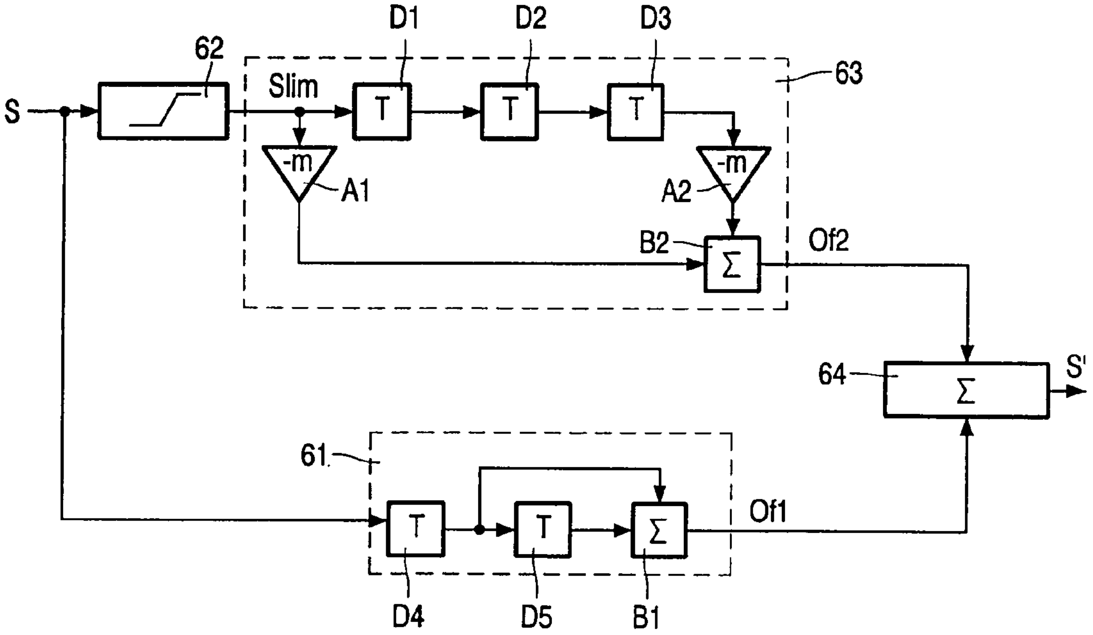
FIG. 3 shows an embodiment of the waveform equalizer according to the invention.

In FIG. 3 the first filter 61 is a FIR filter with tap coefficients [0,1,1]. This means that the input to this filter is delayed by two tap delays D4 and D5, and there are two outputs, one after each tap, having an amplification factor of 1. The tap delays delay the input a time T approximately equal to period of the channel bit clock with which the bits were written on the information carrier. The outputs of the tap delays D4 and D5 are added by the adder B1. The output $O_n$ of the first filter 61 relates to the input, the read signal S, of this filter as expressed in equation 1:

$$O_{f1}(n)=S(n-1)+S(n-2) \qquad \text{Equation 1}$$

where $O_{f1}(n)$ stands for the output of the first filter 61 at sampling instant n, and S(n−1) stands for the input of the first filter 61 at sampling instant n−1.

The second filter 63 is a FIR filter having tap coefficients [−m,0,0,−m]. This means that an input to this filter is delayed by three tap delays D1, D2 and D3, and there are two outputs fed to amplifying units A1 and A2 having an amplification factor of −m. The first amplifier A1 placed directly after the input $S_{LIM}$, the second amplifier A2 is placed after the third delay tap D3. The outputs of the amplifying units A1 and A2 are added by adder B2. The output $O_{f2}$ of the second filter relates to the input $S_{lim}$ of the second filter 63 as expressed in equation 2:

$$O_{f2}(n)=-m.S_{lim}(n)+-m.S_{lim}(n-3) \qquad \text{Equation 2}$$

The total output S' of this embodiment of the waveform equalizer 6:

$$S'=-m.S_{lim}(n)+S(n-1)+S(n-2)+-m.S_{lim}(n-3) \qquad \text{Equation 3}$$

Figure 4:
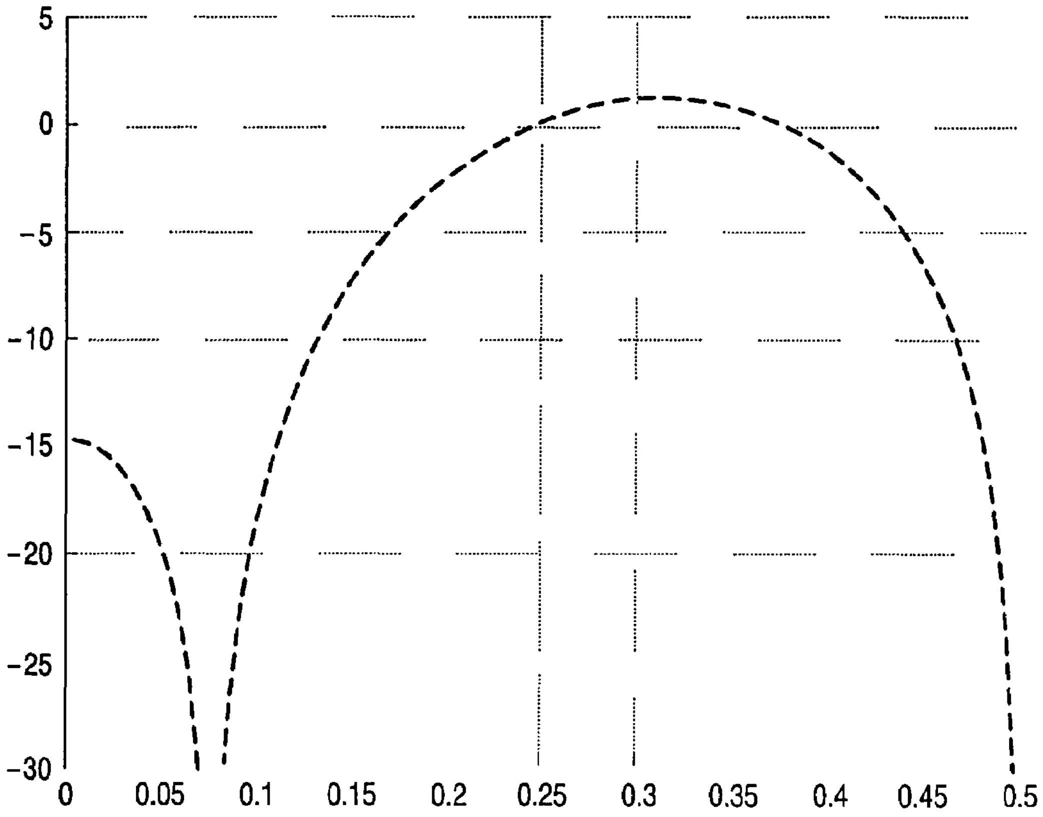
FIG. 4 shows a small signal frequency response of the embodiment of the waveform equalizer as shown in FIG. 3.
Figure 5:
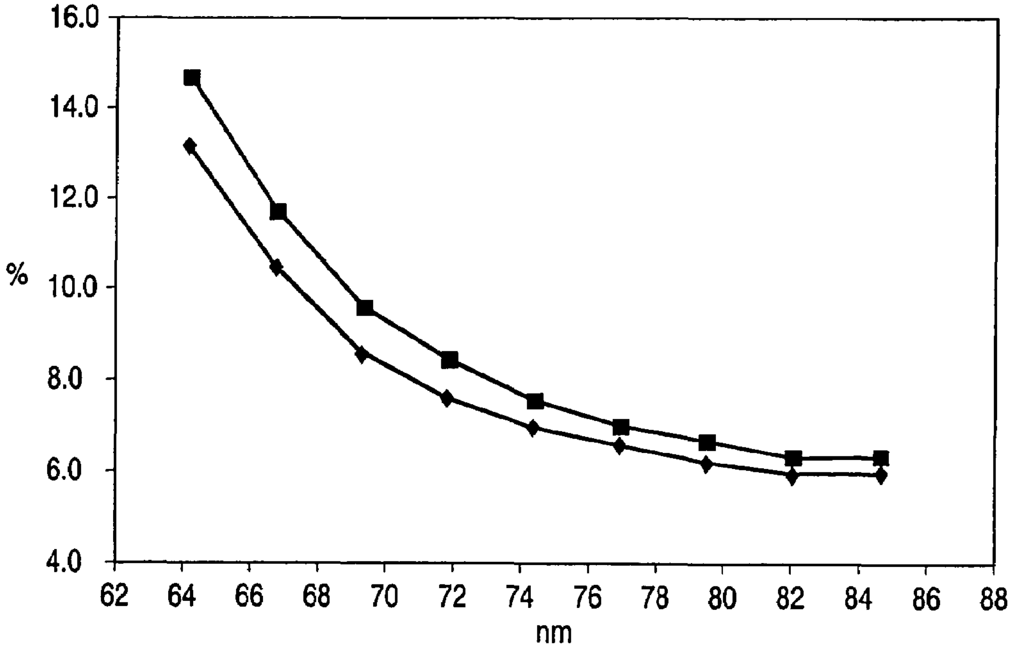
FIG. 5 shows a plot of data jitter as a function of the bit length for the waveform equalizer of FIG. 3 and for the known waveform equalizer.

In a small signal frequency response as shown in FIG. 4 the amplitude limiting means 62 is not limiting the signals. The value of m used in the second filter 63 of the waveform equalizer 6 is 1.3. On the vertical axis the amplitude in decibels dB plotted. On the horizontal axis the normalized frequency with respect to the taps is shown. The highest frequency in the d=1 code occurs when a smallest run is read. The smallest run is two, and the corresponding normalized frequency is 0.25. At the normalized frequency of 0.25 the frequency response is almost at a maximum. Between zero and 0.25 there is a notch visible in the plot. The result of extra suppression of the frequencies in this region is an increased S/N ratio and decreased jitter. In FIG. 5 a plot is shown of the amount of data jitter at the output of this waveform equalizer 6 as a function of bit length, indicated by —◆—. The vertical axis represents the data jitter in percent, and the horizontal axis represents the bit length in nanometers. Bit length is the physical length of a bit on the information carrier 1. In the same plot the data jitter of the output of the known waveform equalizer is depicted, indicated by —■—. The internal structure of the known waveform equalizer corresponds to the structure depicted in FIG. 2, the filters F1 and F2 are however different from the waveform equalizer 6 of the invention. The second filter of the known waveform equalizer is a FIR filter with tap coefficients

[−m, 0, m, 0, m, 0, −m], the first filter only delays the input for three tap delays. The tap delays of the first and second filter are halve of the tap delays of the waveform equalizer 6 of the invention, thus T/2. Equation 4 shows the relation between output $Z_{d1}$ of this filter and the input, the read signal S:

$$Z_{d1}(n)=-m.S_{lim}(n)+m.S_{lim}(n-1)+S(n-1.5)+m.S_{lim}(n-2)+-m.S_{lim}(n-3) \quad \text{Equation 4}$$

The plot of FIG. 5 shows that the data jitter reduces from 6.4% to a value of 6.0% at bit length of 85 nm, when using the waveform equalizer 6 of the invention. The data jitter reduces from 9.6% to a value of 8.6% at bit length of 69 nm. Thus by using the waveform equalizer 6 of the invention the minimum bit length at which the data jitter is at a permissible value, is decreased. This is advantageous for developing a new generation of information reproducing devices.

In the embodiment of FIG. 6 the first filter 61 is a FIR filter with tap coefficients [0,0,1,1]. This means that an input to this filter is delayed by three tap delays D6, D7 and D8, and there are two outputs, one after the second delay D7 and one after the third delay D8, having an amplification factor of 1. The outputs of D7 and D8 are added by adder B1. The output $O_{f1}$ of this first filter relates to the input, the read signal S, of this filter as expressed in equation 5:

$$O_{f1}(n)=S(n-2)+S(n-3) \quad \text{Equation 5}$$

The second filter 63 is a FIR filter having tap coefficients [−m, 0, 0, 0, 0, −m]. This means that an input to this filter is delayed by five tap delays D1 to D5, and there are two outputs fed to amplifying units A1 and A2. The first amplifier A1 is placed directly after the input, the second amplifier A2 is placed after the fifth delay tap D5. The output of the amplifying units A1 and A2 are added by adder B2. The output $O_{f2}$ relates to the input $S_{lim}$ of this filter as expressed in equation 6:

$$O_{f2}(n)=-m.S_{lim}(n)+-m.S_{lim}(n-5) \quad \text{Equation 6}$$

The total output S' of the embodiment of the waveform equalizer 6 is:

$$S'=-m.S_{lim}(n)+S(n-2)+S(n-3)+-m.S_{lim}(n-5) \quad \text{Equation 7}$$

Figure 7:
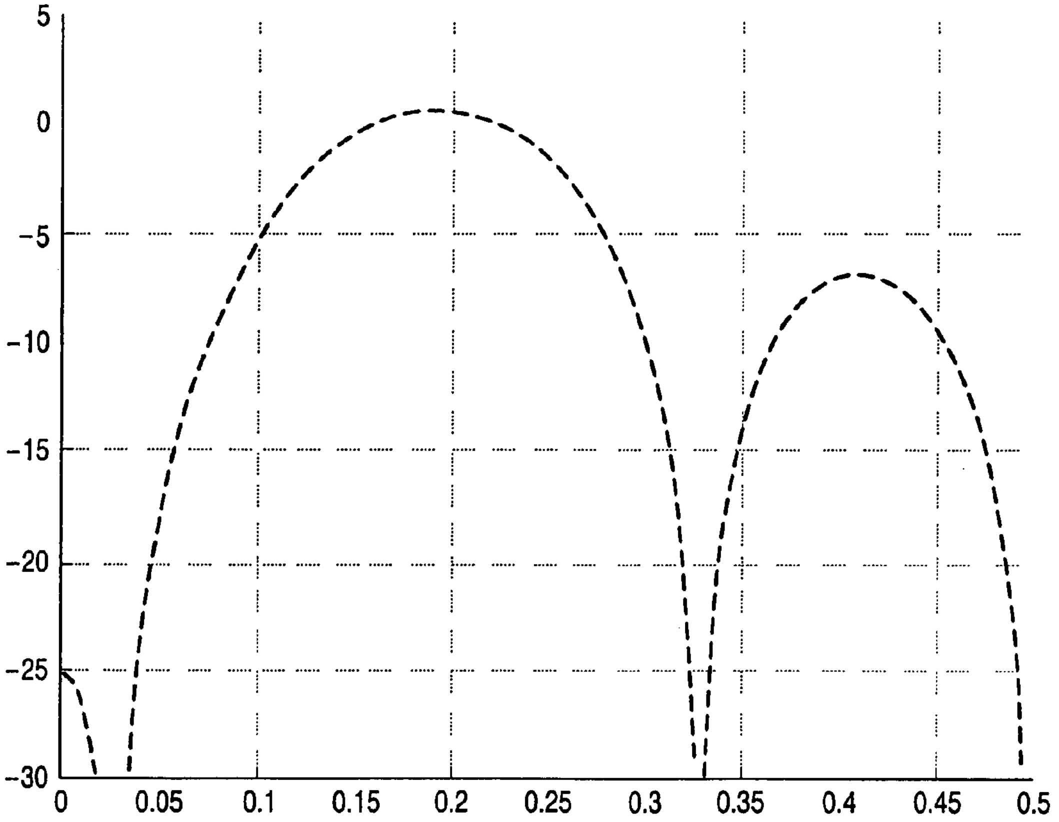
FIG. 7 shows a small signal frequency response of the embodiment of the waveform equalizer as shown in FIG. 6.

In FIG. 7 the units on the axis are the same as in FIG. 4. In the d=2 code the smallest run has a run length of three, and the corresponding normalized frequency is 0.167. At the normalized frequency of 0.167 the frequency response is at a approximately maximum value. The value of m of the waveform equalizer 6 used for extracting this response is 1.1. Again, there is a notch in the frequency region from zero to a frequency at which the small signal frequency response is at a maximum amplitude. The suppression of these frequencies results in an increased S/N ratio and decreased jitter.

In EP-A-0 940 811 a waveform equalizer is disclosed which has a corresponding internal structure as depicted in FIG. 2. The second filter is a FIR filter with tap coefficients [−m, m, 0, m, −m]. The first filter also is a FIR filter with tap coefficients [0, 0, 1]. A limitation of this waveform equalizer is that the bit detector has to sample the output of the waveform equalizer synchronous in respect to the data stored on the information carrier. Furthermore at zero crossing there have to be sampling points. FIG. 8*a* shows an eye pattern of this known waveform equalizer at a sampling frequency ten times the data bit frequency. In FIG. 8*b* an eye pattern is shown of the waveform equalizer 6 of the invention with the embodiment for the d=2 constraint code. In FIGS. 9*a* and 9*b* the sampling is performed at the same frequency as the data bit frequency, and there are sampling points at zero crossing. The eye-patterns of both figures are good; the eyes are wide. In FIGS. 10*a* and 10*b* the sampling points are shifted one halve bit. The eyes of the eye-pattern at the output of the waveform equalizer 6 of the invention is equally wide open as in FIG. 9*b*. The eyes of the eye-pattern at the output of the known waveform equalizer however are more narrow than in FIG. 9*a*. It is clear therefore that only good results with the known waveform equalizer are obtained when sampling bit synchronous and at sampling points at zero crossing. This is a limitation on the use of the known waveform equalizer. The waveform equalizer 6 of the invention doesn't have this limitation as is apparent from the eye-pattern from FIG. 8*b*.

After this description of the invention with reference to preferred embodiments thereof, it is to be understood that these are not limitative examples. Thus, various modifications will be apparent to those skilled in the art, without departing from the scope of the invention, as defined in the claims.

The invention claimed is:

1. A waveform equalizer (6) for obtaining a corrected signal S' by performing a waveform equalization to a read signal S read out from an information carrier (1), comprising:

- a first filter (61) able to perform a filtering process to said read signal S;
- amplitude limiting means (62) able to obtain an amplitude limited read signal $S_{LIM}$ by limiting an amplitude level of said read signal S by a predetermined amplitude limitation value;
- a second filter (63) able to perform a filtering process to said amplitude limited read signal $S_{LIM}$;
- an adder (64) able to add the signals obtained by performing the filtering process by each of said first (61) and second filters (63), able to generate an addition result as said corrected signal S', characterized in that a signal frequency response of said waveform equalizer (6) to signals having an amplitude smaller than said predetermined amplitude limitation value, has a notch in a first frequency region from zero to a frequency at which the signal frequency response is at a maximum amplitude.

2. A waveform equalizer (6) as claimed in claim 1, characterized in that the second filter (63) is a FIR filter having tap coefficients [−m,0,0,−m], and the first filter (61) is a FIR filter having tap coefficients [0,1,1].

3. A waveform equalizer (6) as claimed in claim 1, characterized in that the second filter (63) is a FIR filter having tap coefficients [−m,0,0,0,0,−m], and the first filter (61) is a FIR filter having tap coefficients [0,0,1,1].

4. An apparatus for reproducing information recorded on an information carrier (1), comprising a waveform equalizer (6) as claimed in claim 1.

* * * * *